United States Patent [19]
Ferlings et al.

[11] Patent Number: 5,792,434
[45] Date of Patent: Aug. 11, 1998

[54] DEVICE AND A PROCESS FOR DISSOLVING WATER-SOLUBLE POWDERY POLYMERS

[75] Inventors: Friedhelm Ferlings, Krefeld; Uwe Günther, Deckenpfronn; Hans-Georg Hartan, Kevelaer; Werner Fischer, Willich, all of Germany

[73] Assignee: Stockhausen GmbH & Co. KG, Krefeld, Germany

[21] Appl. No.: 682,566

[22] PCT Filed: Jan. 19, 1995

[86] PCT No.: PCT/EP95/00192

§ 371 Date: Jul. 29, 1996

§ 102(e) Date: Jul. 29, 1996

[87] PCT Pub. No.: WO95/20431

PCT Pub. Date: Aug. 3, 1995

[30] Foreign Application Priority Data

Jan. 28, 1994 [DE] Germany ............. 44 02 547.5

[51] Int. Cl.⁶ ................................ B01D 11/02
[52] U.S. Cl. ............... 422/275; 210/330; 210/335; 210/499
[58] Field of Search ............... 422/275; 210/330, 210/335, 499

[56] References Cited

U.S. PATENT DOCUMENTS

| | | |
|---|---|---|
| 2,312,639 | 3/1943 | Gronemeyer. |
| 5,085,773 | 2/1992 | Danowski ............. 210/335 |
| 5,185,086 | 2/1993 | Kaali et al. ............. 210/335 |
| 5,221,483 | 6/1993 | Glenn et al. ............. 210/335 |
| 5,399,265 | 3/1995 | Nehls ............. 210/499 |
| 5,417,859 | 5/1995 | Bakula ............. 210/499 |
| 5,417,906 | 5/1995 | Chiodo ............. 210/499 |
| 5,589,081 | 12/1996 | Harris ............. 210/499 |

FOREIGN PATENT DOCUMENTS

| | | |
|---|---|---|
| 2398769 | 2/1979 | France. |
| 2100611 | 1/1983 | United Kingdom. |

Primary Examiner—Timothy McMahon
Attorney, Agent, or Firm—Oblon, Spivak, McClelland, Maier & Neustadt, P.C.

[57] ABSTRACT

In a device for dissolving water-soluble, powdery polymers which has a pipe with an inlet to introduce the polymer solution containing gel components and an outlet to discharge the polymer solution, the gel content in the polymer solution is reduced without reducing the viscosity of the polymer solution by means of the fact that the pipe is formed of a plurality of pipe sections which are provided with filters and can be connected with one another.

10 Claims, 2 Drawing Sheets

DEVICE AND A PROCESS FOR DISSOLVING WATER-SOLUBLE POWDERY POLYMERS

BACKGROUND OF THE INVENTION

Field of the Invention

The present invention relates to a device for dissolving water-soluble, powdery polymers by means of a pipe that has an inlet to introduce the polymer solution comprising gel components and an outlet to discharge the polymer solution and which is provided with several filters. Additionally, the present invention relates to a process for eliminating gel components in a polymer solution, wherein the polymer solution is passed through filters which are arranged in tandem and have a decreasing mesh size.

DISCUSSION OF THE BACKGROUND

In aqueous solutions polymers having a high average molar mass (>5 millions) have a strong affinity for the surfaces of suspended colloids or extremely fine particles; this results in flocculation of these particles. As compared to the dissolved state, these particles can be separated from the aqueous solution in a much easier manner when they are in a flocculated state. This property of the polymers is used to improve a solid-liquid separation, e.g., of sludge, carried out, for example, by means of filtration through screen belt and chamber filter presses, or by means of centrifuges. Depending on the surface properties of the particles dispersed in the solution, nonionogenic, anionic or cationic polymer types are used.

The drainage of paper suspensions is also a significant field of application. In these applications it is important to use polymer solutions having a very low gel content; otherwise the papers' resistance to tearing (break of paper in the paper machine) will be deteriorated because the gel particles form undesired irregularities in the paper structure. Additionally, an increased gel content in such aqueous polymer solutions results in a deteriorated activity of the polymer solution since the polymers contained in the gel particles are not effective. In any case, the application possibilities of these polymer solutions are impaired by gel particles.

The polymers are used as dilute aqueous solution, with the concentration of the polymers amounting to <3% by weight. To prepare the aqueous solutions, the required polymer quantity is added to the water under stirring and dispersed in the solution. A maturing time of about 1 to 2 hours is necessary until the polymers dissolve completely; during this time moderate stirring is continued. However, even after the maturing time, the aqueous polymer solutions still contain gel components comprising undissolved polymers.

In order to obtain polymer solutions which are free from gels to the highest possible extent, several shearing systems are known from the prior art. However, in addition to a clear gel reduction, they result also in an undesired viscosity decrease of a polymer solution.

US-PS 4,705,640 describes a process according to which solutions of uncrosslinked polymers are sheared. In this connection, a viscosity drop is observed which is attributed to a polymer degradation going along with an increase in the ionic activity. For this reason, said shearing process can only be used for very high-molecular or cross-linked polymers, since low-molecular polymers have poor application properties owing to the polymer decomposition caused by said shearing process.

US-PS 30 21 269 and DE-OS 27 33 852 describe processes wherein intense shearing results in a gel reduction, however, also causes a mechanical decomposition of the polymers.

EP-PS 0 201 237 describes a shearing process wherein the gel content can be reduced by means of agitators constructed like large domestic mixers rotating at a speed of at least 2000 rpm. In this process as well, mechanical decomposition of the polymers takes place.

EP-PS 0 238 723 describes a process wherein polymer gel can be dissolved by means of a high-slicing shear using a heavy-duty cutting tool, without underlying a molecular degradation. This process uses a very complicated cylindrical arrangement of radially aligned knives positioned to form a vane having radial discharge spaces between the knives. Furthermore, aggregates are additionally necessary, as in the systems according to US-PS 4 705 640 and EP-PS 0 201 237.

EP-PS 0 050 31 2 describes a device and a process for the dispersion and dissolution of polymer powder. In this case, there is a great dependence on the particle size of the polymer powder. At a particle size of the polymer powder of >800 µm distinct effect losses are encountered.

EP-PS 0 051 264 describes a process for dissolving granulates of polymer gels in turbulent solution. Here, a treatment with a salt solution is carried out prior to the actual dissolution process.

GB-OS 2 067 908 describes a device and a process wherein a powder is moistened to form a homogeneous solution. However, the formation of smaller and smallest gel particles cannot be prevented.

DE-OS 32 14 143 describes a device and a process wherein dispersing stations for the polymer solution are arranged within one single elongated chamber. The dispersing stations comprise perforated parts with a smallest mesh size of about 380 µm. This known device is used to dilute a polymer solution of known concentration with a diluting agent to such an extent that a predetermined lower concentration of the polymer solution is achieved.

According to DE-OS 32 14 143 a larger number of parts is required when perforated parts having larger apertures are used, whereas a decrease in pressure takes place and plugging or breakthrough is observed in case of several perforated parts having relatively small openings.

The obtained solution is practically homogeneous; however, it is frequently necessary to keep the dilute product in a storage tank for a period of 0.5 to 1.0 hour in order to set the polymer to perfect homogeneity in the solution.

SUMMARY OF THE INVENTION

Accordingly, it is the object of the present invention to provide a device and a process for dissolving water-soluble, powdery polymers, wherein homogeneous polymer solutions are obtained from aqueous polymer solutions containing gel components within a short time, without a polymer decomposition, in particular under reduction in the solution viscosity, retention or drainage action, occurring.

Another object of the present invention is to provide a device having a simple construction that is variable and can therefore easily be adapted to the product properties and the required process conditions and which is maintenance-free, this means in particular, that it works without plugging effects by utilizing a self-cleaning action.

DETAILED DESCRIPTION OF THE PREFERRED EMBODIMENTS

With respect to the device, said object is achieved according to the present invention by the fact that the pipe is formed of a plurality of tube portions which are provided with filters and can be connected with one another. With respect to the process, said object is achieved according to the present invention by the fact that the mesh width of the filters decreases, starting from about 2000 µm, and that at least one filter having a maximum mesh size of 100 µm is used.

In this connection, the particular surprising finding is the fact that the gel portions which automatically result during the dissolution of powdery polymers do not cause plugging in the device according to the present invention when filters with a very small mesh size are used; and that the process according to the present invention allows a maintenance-free operation without interfering with the effectiveness of the polymers.

Preferred embodiments of the present invention are the subject matter of the subclaims.

The device according to the present invention achieves that the gel content of the polymer solution, when passing through the filters of the plurality of pipe sections, is successively reduced to a desired level in a manner going easy on the polymers. Owing to the mild gradual reduction of the gel portions, a decomposition of the polymers and a viscosity loss caused thereby are substantially avoided. The device according to the present invention has the advantage that the respective number and the arrangement of the pipe sections—and thus the number and arrangement of the used filters as well as their mesh size—may be adjusted, defined and installed on site in consideration of the individual given conditions.

It is preferred that one filter of a tube portion be located at one side of the tube section. Thus, these filters may be replaced in a particularly easy manner.

According to another preferred embodiment of the device according to the present invention, each of the pipe sections has a screw thread, at least at one end thereof, so that they can be connected with one another. Thus, the individual pipe sections can be connected to one another in a rapid and sealed manner. This entails the advantage that the number of pipe sections and therefore the number of filters used can rapidly and effectively be changed.

According to another preferred embodiment of the device according to the present invention, one end of the pipe sections is provided with coupling elements, such as bayonet locks or other quick-acting closures or a screw sleeve, engaging in a screw thread located at the other end of another pipe section. Thus, two pipe portions can be joined without having to twist the one pipe section with respect to the other pipe section.

According to another preferred embodiment of the device according to the present invention, the pipe portions are provided with filters of different mesh size. In this connection, it is useful that the filter mesh width decreases from the inlet of the pipe towards the outlet of the pipe. Thus, the gel content of a polymer solution is reduced by a certain amount on each passage through a filter; in this manner a uniform, continuous reduction of the gel portion is achieved when the solution passes through the device according to the present invention.

The most surprising self-cleansing effect to be observed when the device is used according to the present invention is of particular advantage. Even if the filters are covered only partially with gel components of the swollen, incompletely dissolved polymer, said self-cleaning effect causes the dissolution of said components before plugging occurs.

According to another preferred embodiment of the device according to the present invention, the filter of the first pipe section has a mesh width of 1000 µm or less.

According to another preferred embodiment of the device according to the present invention, up to ten or even more pipe sections are provided. An adequately large number of pipe sections has the advantageous effect that the gel portion is reduced very gently, thus avoiding to a great extent polymer degradation and a resultant viscosity loss of the polymer solution.

According to another preferred embodiment of the device according to the present invention, seven pipe sections are provided. If seven pipe portions are used, an effective and mild reduction of the gel content is achieved with a minimum technical outlay and a minor pressure loss of the polymer solution on passage through the device according to the present invention.

According to another preferred embodiment of the device according to the present invention, the filter of the first chamber section has a mesh size of 1000 µm or less, and the filter of the last pipe section has a mesh size of 100 µm.

According to another preferred embodiment of the device according to the present invention, the filter of the first pipe section has a mesh width of 1000 µm or less, and the filter of the last pipe section has a mesh width of 25 µm. Through this measure it is achieved that the gel particles, after passage through the device according to the present invention, are so small that they dissolve further in the polymer solution after a relatively short period of time.

In the process according to the present invention the mesh size of the filters which are arranged in tandem preferably diminishes from 1000 µm to 100 µm. In case a particularly fine distribution of the polymer in the solution is desired, the mesh size of the successively arranged filters preferably diminishes from 1000 µm to 25 µm. It is also possible that the mesh width decreases, for example, from 800 or 700 micrometers to 25 micrometers. Thereby a sufficient reduction in the gel particle size is achieved; or the gel particles are reduced to such a small size that they continue to dissolve in the solution on their own.

According to another preferred embodiment of the process according to the present invention, the weight percentage of the polymers amounts to <3% of the polymer solution. This ensures that the viscosity of the polymer solution is sufficiently low to press it through the filters of the shearing device according to the present invention without excessive frictional losses.

According to another preferred embodiment of the process according to the present invention, the polymer solution is forced through the filters at a maximum pressure of 20 bar. Operating the shearing device according to the present invention at such pressures has proved to be advantageous; at such pressures the diameter of the shearing device according to the present invention can easily be adapted to the intended polymer solution throughput in such a manner that the diameters of the shearing device need not be unnecessarily large.

In case of pressures higher than 20 bar, there is the risk that the portion of polymers being subjected to a polymer degradation on passage through the filters is so high that the polymer solution undergoes a viscosity reduction owing to the increased number of low-molecular polymers.

According to another preferred embodiment of the process according to the present invention, the polymer solution is forced through the filters at a pressure of between 3 and 8 bar. This value has proved to be most suitable with respect to the diameter of the shearing device, the flow rate of the polymer solution, and the viscosity stability.

BRIEF DESCRIPTION OF DRAWINGS

In the following, the present invention will be illustrated in more detail with reference to an advantageous embodiment of the present invention represented in the figures of the drawings, wherein.

Figure 1:
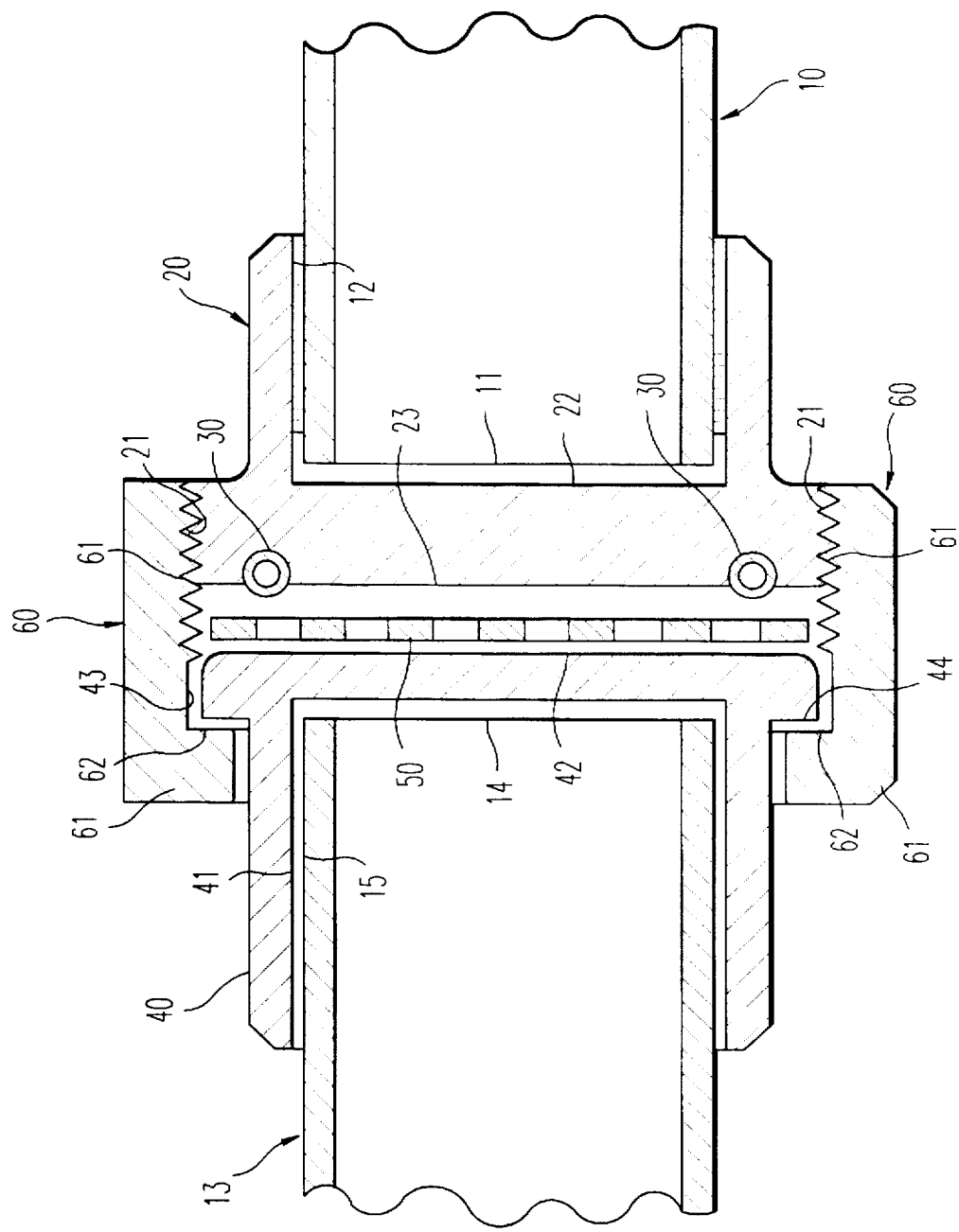
FIG. 1 is a partial cross-sectional view of the shearing device according to the present invention.

In the partial cutout of a shearing device according to the present invention shown in FIG. 1, an end 1 1 of a pipe section 10 is provided with an annular end portion 20, the inner surface 22 thereof lies on the outer surface 1 2 of the pipe section 1 0 in a watertight press fit. A ring-shaped rubber gasket 30 is located at the end surface 23 of the end portion 20. The end portion 20 is provided with a thread along its outer surface 21. The other end 14 of the pipe section 13 is provided with a counter end piece 40; the inner surface 41 of said counterpart 40 lies on the outer surface 1 5 of pipe section 13 in watertight press fit. In the region of the end surface 42, the counterpart 40 is provided with a flange 43. A filter 50 having a given mesh size is located above the end surface 42 of the counterpart 40. A screwed sleeve 60 is located above the flange 43 of the counterpart 40. The front portion of said screw sleeve 60 is provided with a thread 61. The rear region 61 of the screw sleeve 60 is bent inwardly in such a manner that its inner surface 62 is adjacent to the surface 44 of the counterpart 40.

In order to screw pipe sections 10 and 13 together, their end portions 11 and 14 are brought into an opposite position. Then the thread 61 of the screw sleeve 60 is screwed on the thread 21 of end piece 20. In this connection, the counter end piece 40 with the filter 50 mounted thereon is moved toward the end piece 20 of pipe section 10 by pressing the rear part 61 of the screw sleeve 60 against flange 43 of the counterpart 40; this is done by continuously screwing of screw sleeve 60 until the filter 50 is in watertight press fit with the ring seal 30. In this manner, a waterproof connection between pipe section 13 and pipe section 10 is achieved; between them the filter 50 is in a watertight position.

Figure 2:
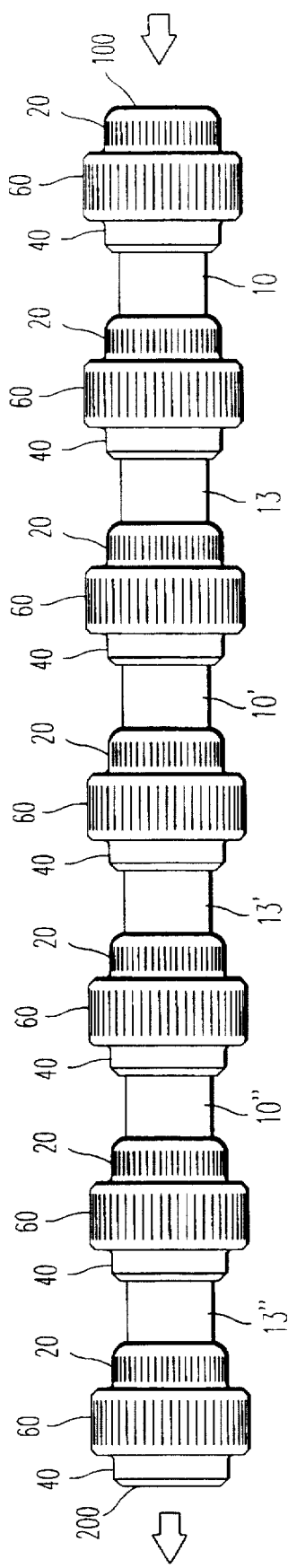
FIG. 2 shows a top view of an embodiment of the device according to the present invention.

The shearing device according to the present invention shown in FIG. 2 has an inlet 100 and an outlet 200. For the purpose of connection with a supply, the inlet 100 is provided with an end portion 20 for the feed pipe (not shown). The other end of pipe section 10 is provided with a counterpart 40 above which a screwed sleeve 60 is positioned. The one end 11 of pipe section 10 is provided with another end piece 20; via a screw sleeve 60, said end piece 20 is connected with the counterpart 40 sealing the end 14 of pipe section 13. The end pieces 20, the counterpart 40, and the screw sleeve 60 shown in top view are built-up in the same manner as the respective components of same reference number shown in FIG. 1 in cross-section. Each of the pipe sections 10, 13, 10', 13', 10", and 13" is provided with identical parts and joined in the same manner as shown in FIG. 1. The other end of the pipe section 13" is also provided with an end piece 20, via a screw sleeve 60 this is connected with a counterpart 40 which is connected with a discharge end piece (not shown).

In the operation of the shearing device according to the present invention the number of tube portions can be increased or reduced according to the prevailing conditions. In particular, different filters 50 having differing mesh sizes may be used, depending on the needs of the given conditions. In the illustrated embodiment, the mesh width of the first filter located near the inlet 100 amounts to 1000 µm, the mesh width of the last filter positioned near the outlet 200 amounts to <100 µm. The mesh width of the intermediate filters is dimensioned such that it continuously decreases with respect to the direction of flow of the polymer solution; i.e., the mesh density of the second filter, relative to the direction of flow, is smaller than the mesh size of the first filter, whereas the mesh size of the third filter, relative to the direction of flow, is smaller than that of the second filter, relative to the direction of flow, etc. The shown shearing device has a length of about 100 cm, the length of the individual pipe sections 10, 13, 10', 13', 10", 13" amounting to 10 cm each. However, the pipe shearing station according to the present invention may also have a total length of 10 cm, with the individual pipe portions being very short; it may also have a length of 200 cm and more.

The shearing device shown in the embodiment example is used to treat aqueous polymer solutions employed in the paper manufacture. Polymers suitable for this application have a nonionogenic, anionic, or cationic charge character. The corresponding monomers primarily are those comprising vinyl groups, in particular acrylic acid or methacrylic acid derivatives.

Usually, the nonionic polymers are based on the following monomers: acrylamide, methacrylamide, N-vinyl methyl acetamide, vinylpyrrolidone, acrylonitrile, methyl methacrylate, and other acrylic acid or methacrylic acid esters. Suitable anionic monomers include salts of the (meth-)acrylic acid, itaconic acid, maleic acid, fumaric acid, vinyl sulfonic acid, 2-acrylamido-2-methylpropane sulfonic acid, and of other polymerizable carboxylic acids or sulfonic acids. Suitable cationic monomers include dialkylaminoalkyl(meth-)acrylamide, dialkylaminoalkyl-(meth-)acrylic acid esters, and quaternized or acidified derivatives thereof.

Test methods (I)

Viscosity

The viscosimetry is carried out in a Brookfield viscometer (type: RVT/spindle II/5 rpm).

Gel 1

800 ml of the corresponding polymer solution are placed on a 315-µm-standard sieve and washed with 3 l of water. The oversized particles are measured volumetrically. The indication is given in ml.

Gel 2

800 ml of the corresponding polymer solution are placed on a 125-µm-standard sieve and washed with 3 l of water. The oversize is determined gravimetrically and multiplied by factor 250. The indication is given in g/kg.

Removal of water

The dewatering is measured with a suitable sewage sludge. To this end, a certain quantity of the polyelectrolyte solution is added to the sludge under constant conditions (10 s at 1000 rpm). After this conditioning, the sludge sample is filtered by means of a hand screen (=dewatered). The wire cloth sieve has a mesh width of 100 µm according to DIN 4188. The dewatering time for 200 ml of the filtrate quantity passing from the start is measured.

Test methods (II)

The drainage of paper pulp is carried out under constant conditions with the Schopper-Riegler-apparatus using 3 g of raw paper-making material to 1000 ml of water, with the added quantities of polymer amounting to 0.01, 0.02, and 0.03%, relative to the paper stock. The flow time of 700 ml of filtrate is measured. The indication is given in s.

The measurement of retention is carried out according to the BRITT-JAR-method by using 2.5 g solid matter (65% pulp and 35% kaolin) to 500 ml, including the retention agent. After 15 s of stirring in the BRITT-JAR (600 and 750 rpm, respectively), a filtrate quantity of between 100 and 150 ml is to be taken at a flow time of 30 s. Therein the solids content is determined by means of conditioned black band filters. The indication is given in %.

EXAMPLES

The Examples will show that the shearing in the pipe shearing station results in a considerable reduction of the gel content, that the polymer solutions are not subjected to a viscosity loss owing to the shearing, and that no plugging of the sieves or filters in the pipe shearing station occurs in the continuous test.

Comparative Example 1 shows that shearing by means of high-speed stirrers (as described in US-PS 4705640 and EP-PS 0201237) results in a good gel reduction but that the viscosity is considerably reduced.

Comparative Example 2 shows that shearing by means of a sieve having an aperture diameter of 1000 μm (as described in DE 27 33 852)—as compared to the result obtained by shearing in the pipe shearing station according to the present invention—does not result in the same good gel reduction at the same flow capacity as in the pipe shearing station.

Two 1000 μm sieves and one 315 μm sieve were used in Comparative Example 9. In this case too, it was found that the gel decomposition was insufficient.

Further Examples show that a gel reduction takes place without the defined sieve arrangement, wherein one sieve of >1000 μm and several sieves of <1000 μm or <100 μm are to be used, but that a maintenance-free continuous operation is not possible owing to the occupation of the sieves of the pipe shearing station.

Example 1

A 0.5% aqueous solution was prepared from an about 45% cationic polyelectrolyte (granulate).

After a swelling time of 15 to 30 minutes treatment with a pipe shearing station (PSS) was carried out. To this end, the solution was pumped over the pipe shearing station by means of an eccentric worm pump.

| | |
|---|---|
| sieves in the PSS: | 1 × 1,000 μm |
| | 2 × 315 μm |
| | 2 × 125 μm |
| | 1 × 25 μm |
| distances between sieves: | 8 cm |
| diameter of pipes: | 1.4 cm (inside diameter) |
| dead volume of PSS: | 70 ml |
| total volume of the treated 0.5% solution: | 53.2 l |
| max. pumping capacity: | 66.9 l/h |
| working pressure: | 4.0–5.5 bar |

TABLE 1

| Sample | Gel [ml] | Viscosity [mPa.s] | Sampling was carried out after [l] of flow |
|---|---|---|---|
| untreated | 24 | 520 | 7 |
| treated | <5 | 640 | 14 |
| | <5 | 630 | 35 |
| | <5 | 530 | 42 |
| | <5 | 600 | 49 |

Example 2

Preparation and treatment of the solution as in Example 1.

| | |
|---|---|
| sieves in the PSS: | 1 × 1,000 μm |
| | 2 × 500 μm |
| | 2 × 250 μm |
| | 1 × 125 μm |
| | 1 × 50 μm |
| distances between sieves: | 15 cm |
| diameter of pipes: | 5 cm (inside diameter) |
| dead volume of PSS: | 2.4 l |
| total volume of the treated 0.5% solution: | 120 l |
| max. pumping capacity: | 400 l/h |
| working pressure: | 6–7 bar |

TABLE 2

| Sample | Gel [ml] | Viscosity [mPa.s] | Sampling was carried out after [l] of flow |
|---|---|---|---|
| untreated | 40 | 880 | 40 |
| treated | <5 | 1.000 | 30 |
| | <5 | 930 | 60 |
| | <5 | 1.080 | 90 |

Comparative Example 1

From each of two (A and B) about 45% cation-active polyelectrolytes (powder) a 0.5% aqueous solution was prepared.

After a swelling time of 5 minutes, a 10-minute treatment with a high-speed stirrer (20,000 rpm) was carried out.

TABLE 3

| Sample | Gel [ml] | Viscosity [mPa.s] |
|---|---|---|
| A / untreated | 34 | 630 |
| A / treated | 0 | 130 |
| B / untreated | 11 | 530 |
| B / treated | 0 | 135 |

Comparative Example 2–8

Changing the number of sieves in PSS and preparation of solution as in Example 1.

max. pumping capacity: 33.4 l/h diameter of pipe: 1.4 cm (inside diameter)

TABLE 4

| Comparative Example | Number of sieves | Working pressure [bar] | Gel [1) [ml] | Viscosity [mPa.s] | State of PSS after [2) |
|---|---|---|---|---|---|
| | untreated sample | /. | 26 | 570 | |
| 2 | 1 × 1,000 μm | /. | 28 | 540 | not clotted |
| 3 | 1 × 315 μm | 0.5 | 20 | 600 | not clotted |
| 4 | 1 × 125 μm | 1.5 | 5 | 770 | slightly covered |
| 5 | 1 × 25 μm | 4.0 | <5 | 700 | highly covered |
| 6 | 2 × 315 μm | 0.8 | 17 | 600 | not clotted |
| 7 | 2 × 25 μm | 7.0 | <5 | 440 | highly covered |
| 8 | 125 μm/25 μm | 3.0 | <5 | 540 | slightly covered |

TABLE 4-continued

| Comparative Example | Number of sieves | Working pressure [bar] | Gel [1] [ml] | Viscosity [mPa.s] | State of PSS after [2] |
|---|---|---|---|---|---|

[1] Rating after 2 I passed
[2] Rating after 3 I passed

Comparative Example 9
Preparation of solution as in Example 1.

| sieves in the PSS: | 2 × 1,000 μm |
| | 1 × 315 μm |
| distances between sieves: | 8 cm |
| dead volume of PSS: | 30 ml |
| diameter of pipes: | 1.4 cm (inside diameter) |
| total volume of the treated 0.5% solution: | 2.4 |
| max. pumping capacity: | 33.4 l/h |
| working pressure: | 0.7 bar |

TABLE 5

| Sample | Gel [ml] | Viscosity [mPa.s] | Sampling carried out after [I] passage |
|---|---|---|---|
| untreated | 40 | 460 | 0.8 |
| treated | 12 | 530 | 1.6 |
|  | 13 | 570 | 2.4 |

Example 3 shows for a cationic polymer that the swelling times (maturing times) can be reduced considerably by means of the pipe shearing station; lower gel-2-values are achieved as compared to those for polymer solutions that have long maturing times and which are not treated with the pipe shearing station. The Comparative Examples using untreated polymer solutions at a swelling time of 10–60 minutes show that the gel content decreases considerably by treating the solutions with the pipe shearing station, and that there is no viscosity loss.

Example 4 illustrates the same circumstances as in Example 1, with the exception that the examination of an anionic polymer is described.

Example 5 shows that treating a polymer solution containing large gel amounts with the pipe shearing station results in a polymer solution that has considerably lower amounts of gel and which exhibits clearly better sludge draining values than the untreated polymer solution.

Example 6 illustrates that the treatment of the polymer solutions with the pipe shearing station considerably reduces the gel content, without resulting in a deterioration of the application technological properties as compared to the untreated polymer solution.

Example 7 shows that the gel content of a polymer already suitable for the use in papermaking, owing to its low gel content, can be reduced further by the treatment with the pipe shearing station, without reducing the application technological values for paper drainage and retention.

Example 3

A 0.5% aqueous solution was prepared from an about 45% cation-active polyelectrolyte (granulate).

After a certain swelling time (maturing time), the treatment with a pipe shearing station (PSS) was carried out. To this end, the solution was pumped over the PSS by means of an eccentric screw pump.

| sieves in the PSS: | 1 × 1,000 μm |
| | 2 × 315 μm |
| | 2 × 125 μm |
| | 1 × 25 μm |
| distances between sieves: | 8 cm |
| inside diameter of pipes: | 1.4 cm |
| dead volume of PSS: | 70 ml |
| max. pumping capacity: | 34 l/h |

| Sample | Swelling time (min) | Gel 1 (ml) | Gel 2 (g/kg) | Viscosity II/5 (mPa.s) | Sampling after (I) passed |
|---|---|---|---|---|---|
| 1/untreated | 10 | >100 | >5000 | 2400 | /. |
| 2/treated | 10 | <5 | 200 | 2040 | 2.4 |
| 3/treated | 15 | <5 | 72.5 | 2200 | 2.4 |
| 4/untreated | 20 | 75 | >5000 | 2700 | /. |
| 5/untreated | 30 | 20 | >5000 | 2340 | /. |
| 6/treated | 30 | <5 | 50 | 2120 | 2.4 |
| 7/untreated | 40 | 9 | >5000 | 2240 | /. |
| 8/untreated | 50 | 5 | >5000 | 2340 | /. |
| 9/untreated | 60 | <5 | 825 | 2160 | /. |
| 10/untreated | 90 | <5 | 775 | 2040 | /. |
| 11/untreated | 180 | <5 | 400 | 2000 | /. |
| 12/untreated | 360 | <5 | 193 | 1750 | /. |

Example 4

A 0.5% solution was prepared from an about 40% anion-active polyelectrolyte (granulate), the swelling times were varied.

Kind of sieves in PSS: The treatment of the solution with the pipe shearing station was carried as in Example 3.

| Sample | Swelling time (min) | Gel 1 (ml) | Gel 2 (g/kg) | Viscosity II/5 (mPa.s) | Sampling after(I) passed |
|---|---|---|---|---|---|
| 13/untreated | 10 | 35 | >5000 | 1700 | /. |
| 14/treated | 10 | <5 | <25 | 2020 | 2.4 |
| 15/untreated | 20 | 25 | >5000 | 2140 | /. |
| 16/treated | 20 | <5 | <25 | 2200 | 2.4 |
| 17/untreated | 30 | 13 | >5000 | 2180 | /. |
| 18/treated | 30 | <5 | <25 | 1960 | 2.4 |
| 19/untreated | 40 | 12 | >5000 | 2260 | /. |
| 20/untreated | 50 | 10 | >5000 | 2300 | /. |
| 21/untreated | 60 | 9 | >5000 | 2260 | /. |

Example 5

A 0.1% aqueous solution was prepared from an about 75% cation-active polyelectrolyte (granulate).

After a swelling time of 15 min., the treatment with the pipe shearing station (PSS) was carried out. To this end, the solution was pumped over the PSS by means of a peristaltic pump.

| sieves in PSS: | 1 × 2,000 μm |
| | 1 × 1,000 μm |
| | 2 × 315 μm |

-continued

|  |  |
| --- | --- |
| distances between sieves: | 2 × 100 µm<br>1 × 25 µm<br>8 cm |
| inside diameter of pipes: | 1.4 cm |
| dead volume of PSS: | 70 m |
| max. pumping capacity: | 3.2 l/h |

| Sample | Gel 1 (ml) | Sludge drainage with 170 ppm (s) | Sampling was effected after (I) of flow |
| --- | --- | --- | --- |
| 22/untreated | >100 | 180 | ./. |
| 23/treated | <5 | 48 | 2.4 |

Example 6

A 0.5% aqueous solution was prepared from an about 45% cation-active polyelectrolyte (granulate).

After a certain swelling time (15 min.), the treatment with the pipe shearing station (PSS) was carried out. To this end, the solution was pumped over the PSS by means of a peristaltic pump. (Procedure and construction as in Example 5).

| Sample | Gel 2 (g/kg) | Viscosity II/5 (mPa · s) | Drainage of paper pulp | | | Retention | | Sampling was effected after (I) passed |
| --- | --- | --- | --- | --- | --- | --- | --- | --- |
| | | | 0.01% | 0.02% | 0.03% | 0.04% | 0.08% | |
| 24/untr. | 5720 | 1890 | 57.7 | 39.7 | 30.6 | 68.8 | 88.2 | ./. |
| 25/tr. | 260 | 1800 | 58.6 | 40.5 | 30.8 | 69.6 | 89 | 0.8 |
| 26/tr. | 240 | 1840 | 58.1 | 39.5 | 30.5 | 69.2 | 88.2 | 5.6 |

Example 7

A 0.5% aqueous solution was prepared from an about 25% cation-active polyelectrolyte (granulate).

After a swelling time of 15 min., the treatment with the pipe shearing station (PSS) was carried out. (Procedure and as in Example 5). To this end, the solution was the PSS by means of a peristaltic pump.

| Sample | Gel 2 (g/kg) | Drainage of paper pulp | | | Retention | | Sampling was effected after (I) passed |
| --- | --- | --- | --- | --- | --- | --- | --- |
| | | 0.01% | 0.02% | 0.03% | 0.04% | 0.08% | |
| 27/untr. | 62.5 | 57.7 | 37.8 | 32.4 | 37.8 | 53.9 | ./. |
| 28/tr. | 50 | 55 | 37.2 | 30.8 | 43 | 55.2 | 2.4 |

We claim:

1. A process for dissolving water-soluble, powdery polymers in a device,
   which device comprises piping means having inlet means for introducing polymer solutions comprising gel portions and outlet means for discharging the polymer solutions, and a plurality of piping section means, which comprise filtering means and which are connectable with one another, wherein at least one of said filtering means has a maximum mesh width of about 100 µm; and wherein said process comprises passing aqueous polymer solution comprising gel portions through successively arranged filtering means of decreasing mesh width, wherein at least one of said filtering means has a maximum mesh width of about 100 µm.

2. The process of claim 1, wherein the polymer solution is passed through filtering means decreasing in mesh width from about 1000 µm to a maximum of about 100 µm.

3. The process of claim 1, wherein the mesh size of the filtering means decreases from about 1000 µm to a maximum of about 50 µm.

4. The process of claim 3, wherein the mesh size of the filtering means decreases from about 1000 µm to a maximum of about 25 µm.

5. The process of claim 1, wherein the aqueous polymer solution contains less than 3% by weight of polymer.

6. The process of claim 1, wherein the aqueous polymer solution is forced through said filtering means at a maximum pressure of about 20 bar.

7. The process of claim 6, wherein the aqueous polymer solution is forced through said filtering means at a pressure of between about 3 and 8 bar.

8. The process of claim 1, wherein said aqueous polymer solution comprises a polymer containing units of a non-ionic monomer selected from the group consisting of acrylamide, methacrylamide, N-vinyl methyl acetamide, vinyl pyrrolidone, acrylonitrile, esters of acrylic acid, and esters of methacrylic acid.

9. The process of claim 1, wherein said aqueous polymer solution comprises an polymer containing units of an anionic monomer selected from the group consisting of salts of (meth)acrylic acid, itaconic acid, maleic acid, fumaric acid, vinyl sulfonic acid and 2-acrylamido-2-methylpropane sulfonic acid.

10. The process of claim 1, wherein said aqueous polymer solution comprises a polymer containing units of a cationic monomer selected from the group consisting of dialkylaminoalkyl (meth)acrylamide and dialkylaminoalkyl (meth) acrylic acid esters.

\* \* \* \* \*